United States Patent

Kuster

[15] 3,703,717

[45] Nov. 21, 1972

[54] VOLTAGE/FREQUENCY RATIO MONITOR FOR A. C. SIGNALS

[72] Inventor: Karl H. Kuster, Glendale Heights, Ill.

[73] Assignee: GTE Automatic Electric Laboratories Incorporated, Northlake, Ill.

[22] Filed: Jan. 11, 1971

[21] Appl. No.: 105,174

[52] U.S. Cl.................340/253 Y, 317/147, 324/78 S

[51] Int. Cl...............................................G08b 21/00

[58] Field of Search...........340/253 R, 248 C, 253 Y; 317/147, 148; 324/78 S; 323/56

[56] References Cited

UNITED STATES PATENTS

| | | | |
|---|---|---|---|
| 2,757,320 | 7/1956 | Schuh, Jr. | 317/147 |
| 3,337,777 | 8/1967 | Schwanenflugel | 317/147 |
| 3,173,065 | 3/1965 | Fullerton | 317/147 |
| 3,311,907 | 3/1967 | Teal | 340/248 C |
| 3,209,212 | 9/1965 | Billings | 317/147 |
| 3,075,127 | 1/1963 | Secunde et al. | 317/147 |
| 3,004,220 | 10/1961 | Williamson | 317/147 |
| 2,947,863 | 8/1960 | Buie | 317/147 |
| 3,341,748 | 9/1967 | Kammiller | 340/248 C |

*Primary Examiner*—John W. Caldwell
*Assistant Examiner*—Robert J. Mooney
*Attorney*—K. Mullerheim, Robert J. Black, B. E. Franz and Theodore C. Jay, Jr.

[57] ABSTRACT

A circuit for use with a signal generator to monitor the output signals, that provides an alarm indication if either voltage or frequency fall below or exceed predetermined limitations. Only signals within a permissible voltage/frequency ratio, regardless of limitations, are considered acceptable. Monitoring of voltage/frequency ratio, signal symmetry, and voltage amplitude are included.

8 Claims, 3 Drawing Figures

INVENTOR
Karl H. Kuster

BY [signature]

AGENT

PATENTED NOV 21 1972

3,703,717

INVENTOR
Karl H. Kuster

BY

AGENT

VOLTAGE/FREQUENCY RATIO MONITOR FOR A. C. SIGNALS

BACKGROUND OF THE INVENTION

1. Field of the Invention

The present invention pertains to signal generators of the type having square wave, sinusoidal, or sawtooth wave shapes such as might be utilized in providing supervisory signals in telephone systems. More specifically the present invention is drawn to a monitor circuit for use with a signal generator, that provides an alarm indication if signal generator outputs are inappropriate for use in a telephone system.

Signal generators providing a variety of different frequency signals are employed extensively in telephone systems, for ringing, ring-back, ring trip and other purposes. Particularly in newly developed electronic telephone systems the use of such signal generators is extensive. Because of the character of electronic circuitry the accuracy of signals produced by such signal generators is highly critical. Accordingly it becomes increasingly important to provide some means for successfully monitoring the outputs of signal generators to determine if the signals produced therein are of an acceptable nature.

2. Description of the Prior Art

Previous signal generator monitors conventionally monitor voltage level outputs and by means of high-low limit circuitry are capable of providing appropriate signals when voltage level exceeds, or is less than, predetermined limitations. Additionally frequency meters have been utilized to provide indication of signals of appropriate frequency. One monitor or detector circuit useful for determining the presence of an output signal of appropriate frequency and at least minimum output magnitude is disclosed in U.S. Pat. No. 3,173,065 to W. T. Fullerton issued Mar. 9, 1965. However no monitoring arrangements are known that successfully integrate all the functions taught in the present invention.

SUMMARY OF THE INVENTION

Because of noise considerations electric power for telephone operations is usually derived from batteries. In most telephone central offices 48 volt battery supplies are utilized to provide power for the switching equipment and telephone talking battery. Where requirements exist for tone signals (for supervisory and/or other purposes) some form of D.C. to A.C. converter is conventionally employed. Whether these devices employ rotary machinery or some sort of solid state commutation they are all powered by the central office battery. While this battery is normally 48 volts it can well be as low as 42 volts or as high as 56 volts. In D.C. to A.C. signal generators the output frequency is normally input voltage dependent. While this is permissible the voltage/frequency ratio must be maintained within a certain constant, for example .120 ± 5% volts/Hz. For example if the output amplitude is 54 volts the output frequency must be 450 ± 5% Hz. or if the output amplitude is 44 volts the output frequency must be 367 ± 5% Hz. Any voltage frequency combination falling outside of these limitations is unacceptable for use in the circuitry of an electronic telephone exchange. Monitoring the signal output of a generator that meets these requirements is achieved in the present invention by utilizing a combination of detectors any of which is capable of actuating a common output latch circuit. Actuation of the latch circuit in turn operates an alarm which may take any convenient form either audible or visual.

In the arrangement of the present invention a low frequency/voltage ratio detector provides an indication when the frequency of the output signal is below accepted standards. Another detector is utilized to indicate if the voltage frequency ratio is above accepted standards and further that the wave shape is of proper symmetry. Outputs from the high voltage/frequency ratio and symmetry error detector are extended to two other detectors to determine the presence of high voltage conditions or low voltage conditions. The latch circuitry may be actuated from any one of the four combined detectors to operate the alarm circuitry as noted previously. The utilization of transformers with saturable cores as voltage/frequency ratio sensitive devices and zener diodes to determine potential limits, provide in combination a highly accurate means for accomplishing the monitoring tasks for which the present invention is intended.

BRIEF DESCRIPTION OF THE DRAWING

FIG. 2 is a chart showing the permissible voltage/frequency output combinations of a signal generator used in a telephone central office which the monitoring circuit of the present invention would be utilized with.

DESCRIPTION OF THE PREFERRED EMBODIMENT

Figure 1:
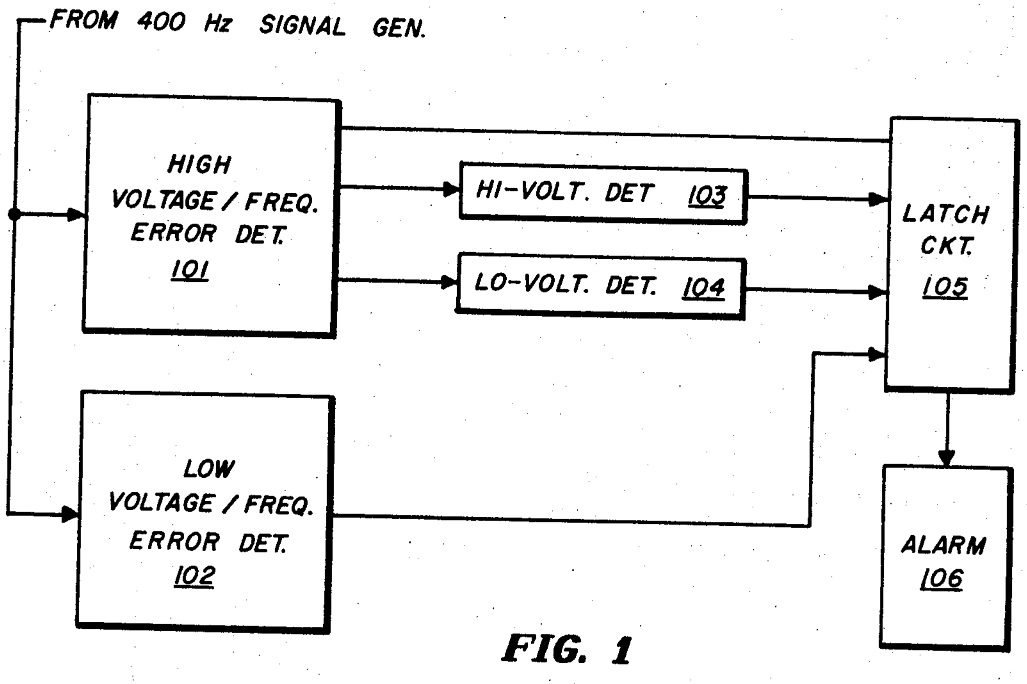
FIG. 1 is a functional block diagram of a signal monitor embodying the present invention.
Figure 2:
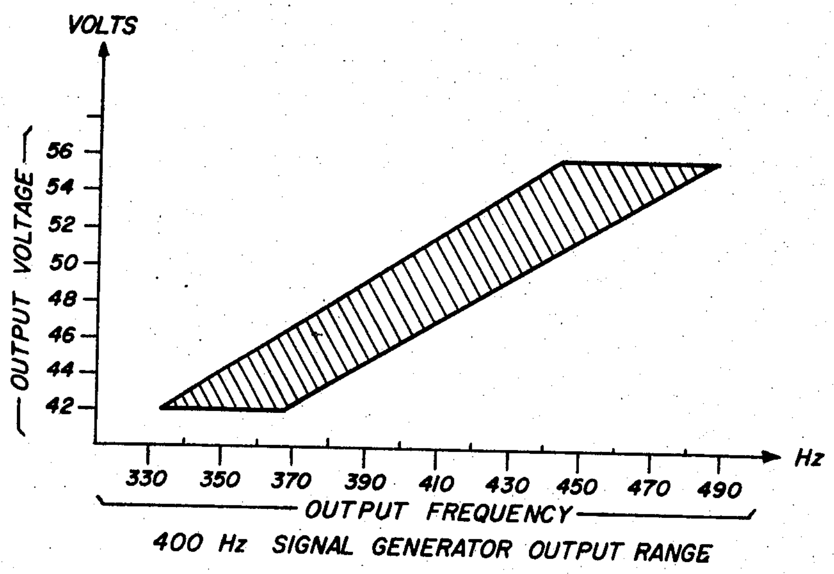

Referring to FIG. 1 the functional portions of the present invention as noted previously consist of a high voltage/frequency ratio error detector 101 having its input connected directly to the signal generator output and having an output extending to latch circuit 105. Low voltage/frequency ratio error detector 102 has its input likewise connected directly to the generator output and its output to the latch circuit 105. High voltage detector 103 has its input connected to error detector 101 and its output to the latch circuit 105, and low voltage detector 104 also has its input connected to error detector 101 and output to the latch circuit 105. The output of latch circuit 105 is connected to the alarm 106.

Figure 3:
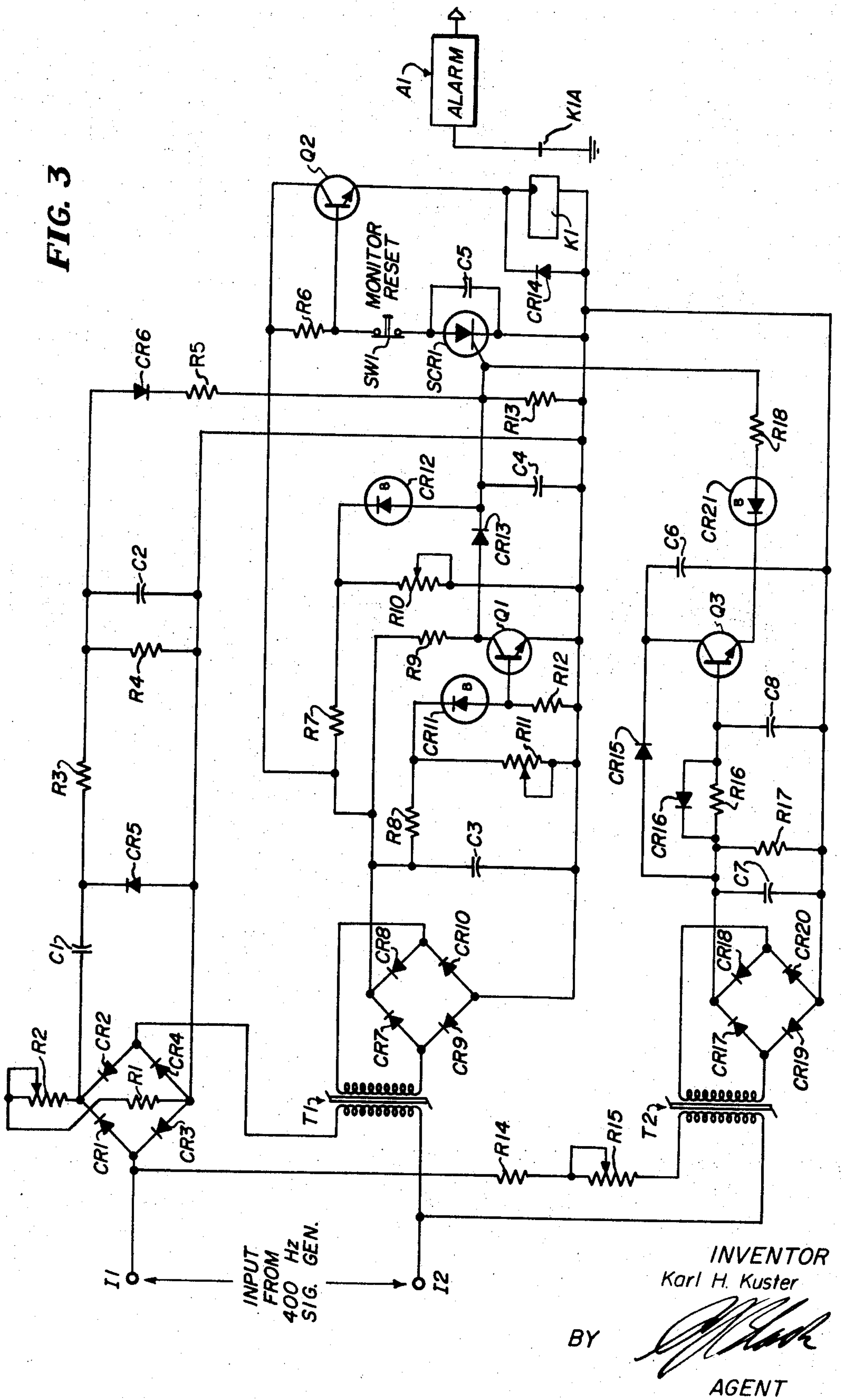
FIG. 3 is a schematic circuit diagram of a signal monitor in accordance with the present invention.

The detailed circuitry of the functional blocks noted above is shown in and can be understood by reference to FIG. 3 wherein the high voltage/frequency ratio error detector circuitry consists of saturable core transformer T1 connected to the generator output and a rectifier bridge consisting of rectifiers CR1 through CR4 inclusive, resistance R1 and potentiometer R2. Also included in this circuit are capacitors C1 and C2, resistances R3, R4 and R5 and diodes CR5 and CR6.

The low voltage/frequency ratio error detector circuitry includes saturable core transformer T2 which is connected to the output of the signal generator and over a path that includes resistor R14 and potentiometer R15, a rectifier bridge consisting of rectifiers CR7 through CR10 inclusive and capacitors C6, C7 and C8. Also included in the circuitry for the low voltage/frequency detector are resistances R16 though R18 inclusive, diodes CR15 and CR16, transistor Q3 and breakdown diode CR21.

The characteristics of input transformer T1 are chosen so that its volt/Hz characteristics will retain transformer T1 unsaturated in response to nominal outputs from the signal generator, but such that transformer T1 will go into saturation every time the volt/Hz product to the generator output is above acceptable limits. Transformer T2's characteristics are chosen so that it is saturated in response to a nominal signal generator output but will go out of saturation every time the volt/Hz product of the generator goes below the acceptable limitations.

Another rectifier bridge consisting of rectifiers CR7 through CR10 inclusive is connected to the secondary of transformer T1 that was included in the high voltage/frequency detector circuit. A rectified signal is derived from this point across filter capacitor C3, which is directly proportional to the generator's output voltage amplitude. The high voltage detector is connected to this point through resistor R7 and includes potentiometer R10 and breakdown diode CR12. The low voltage detector circuitry is also connected at the same point through resistor R8 and includes potentiometer R11, resistors R9 and R12, breakdown diode CR11, transistor Q1 and diode CR13. The output of both high and low voltage detector circuitry as well as the output of both the high and low voltage/frequency ratio error detectors, are connected to the input of the latch circuitry at the gate of silicon controlled rectifier SCR1. Capacitor C4 connected across the output of both high and low voltage detectors, prevents the presence of transients in the output waveform of the generator from causing false alarm conditions. The latch circuitry includes silicon controlled rectifier SCR1 mentioned previously, resistors R6 and R13, capacitor C5, transistor Q2, diode CR14 and monitor reset key SW1, as well as relay K1 and contacts K1A of which extend operating potential to an alarm device, A1. As noted previously the alarm device may assume any desired form.

During normal operation with voltage frequency combinations applied to the input of the present monitor circuitry at terminals I1 and I2, transformer T1 is never driven into saturation. However transformer T2 goes into saturation each half-cycle.

If the voltage/frequency ratio of the generator's output drops 5 percent below nominal (.114 volts/Hz.) for example 420 Hz. at 44 volts, transformer T2 will no longer go into saturation during each half-cycle. Under these conditions capacitor C8 can no longer discharge during the half-cycles when transformer T2 was in saturation. Although capacitor C8 can discharge much faster than it can charge, discharge is prevented when the voltage frequency ratio drops below the 5% figure, the voltage across capacitor C8 will thus rise above the firing voltage of breakdown diode CR21 within a few half-cycles time. Transistor Q3 then acts to reduce the high impedance level at capacitor C8 so that silicon controlled rectifier SCR1 in the latch circuitry is fired when breakdown diode CR21 fires. With the operation of silicon controlled rectifier SCR1, transistor Q2 in the output latch circuit will be rendered non-conductive and cause normally operated relay K1 in series with the emitter of transistor Q2 to operate. At break contacts relay contacts K1A the alarm device A1 will be caused to operate.

Alternately if the voltage/frequency ratio of the generator's output increases more that 5 percent above nominal (.126 volts/Hz.), for example 372 Hz. at 50 volts, transformer T1 will go into saturation during each half-cycle producing large voltage pulses across potentiometer R2 and resistor R1. These pulses are decoupled through capacitor C1 and filtered by resistance R3 and capacitor C2 then coupled through diode CR6 and resistor R5 to silicon controlled rectifier SCR1. Silicon controlled rectifier SCR1 is then fired and operates the latch circuit, and consequently the alarm in the manner previously described.

If proper symmetry of the generator output pulses is not present, transformer T1 will go into saturation during each cycle of operation again producing pulses across potentiometer R2 and resistor R1. In a manner described above silicon controlled rectifier SCR1 will be fired and the alarm A1 actuated.

As noted previously the voltage across capacitor C3 is directly proportional to the generator's output voltage amplitude. If the generator's output voltage goes above a figure of 56 volts (peak in), for example 480 Hz. at 57 volts, breakdown diode CR12 will fire and in turn cause silicon controlled rectifier SCR1 to operate, rendering the latch and alarm circuits operative. If the generator's output voltage goes below 42 volts (peak in), for example 340 Hz. at 41 volts, breakdown diode CR11 will cease to conduct turning transistor Q1 off, resulting in the extension of adequate operating potential through diode CR13 to silicon controlled rectifier SCR1. Again SCR1's operation will cause operation of the alarm in the manner described previously.

Initially the limits of the present monitor circuit must be set. The first adjustment is made with potentiometer R2 which establishes the high voltage/frequency ratio limit. R15 is then adjusted to determine the low voltage/frequency ratio limit. The high output voltage amplitude limit is established by adjustment of potentiometer R10 and the low output voltage limit by potentiometer R11.

While but one embodiment of the present invention has been shown the values, components and arrangement of the circuitry described therein should not be construed as a limitation of the present invention. Other arrangements will be obvious from the embodiment disclosed herein and would fall within the spirit and scope of the present invention.

What is claimed is:

1. A source of alternating current signals, alarm means, and connected therebetween a circuit for monitoring a plurality of variable characteristics of said alternating current signals, and in response to detection of signals that deviate from predetermined values, to operate said alarm means, said monitoring circuit comprising: a latch circuit; first detection means operated in response to the ratio of frequency to voltage of signals from said generator being in excess of a first predetermined value to trigger said latch circuit; and second detection means operated in response to the ratio of frequency to voltage of said alternating current signal from said generator being less than a second predetermined value to trigger said latch circuit; trigger of said latch circuit effective to operate said alarm means.

2. A monitoring circuit as claimed in claim 1 wherein is further included: third detection means operated in response to the voltage amplitude of said alternating current signals from said generator being in excess of a third predetermined value to trigger said latch circuit; and fourth detection means operated in response to the voltage amplitude of said alternating current signals from said generator being below a fourth predetermined value to trigger said latch circuit.

3. A monitoring circuit as claimed in claim 1 wherein said first detection means include: a saturable core transformer, saturated in response to alternating current signals whose ratio of frequency to voltage is in excess of said first predetermined value to cause conduction of a triggering potential to said latch circuit.

4. A monitoring circuit as claimed in claim 1 wherein said second detection means include: a saturable core transformer, normally saturated and rendered unsaturated in response to alternating current signals from said generator being below said second predetermined limit, said unsaturated condition of said transformer effective to cause conduction of a triggering potential to said latch circuit.

5. A monitoring circuit as claimed in claim 2 wherein said third detection means include: a breakdown diode rendered conductive in response to signals from said alternating current generator being of a magnitude in excess of said third predetermined value, to extend a triggering potential to said latch circuit.

6. A monitoring circuit as claimed in claim 2 wherein said fourth detection means include: a normally conductive breakdown diode, rendered nonconductive in response to the magnitude of voltage of alternating current signals from said generator being below said fourth predetermined limit, whereby a triggering potential is diverted to said latch circuit.

7. A monitoring circuit as claimed in claim 1 wherein said latch circuit comprises: a silicon controlled rectifier operated in response to said operated first detection means, and operated in response to said operation of second detection means; and a relay operated in response to operation of said silicon controlled rectifier to render said alarm means operated.

8. A monitoring circuit as claimed in claim 2 wherein said latch circuit comprises a silicon controlled rectifier operated in response to any one of said detection means; and a relay operated in response to operation of said silicon controlled rectifier to render said alarm means operated.

* * * * *